United States Patent
Miyamoto et al.

(10) Patent No.: US 9,102,028 B2
(45) Date of Patent: Aug. 11, 2015

(54) MACHINE TOOL COOLING SYSTEM AND COOLING METHOD

(75) Inventors: Satoshi Miyamoto, Nabari (JP); Naoki Furukawa, Iga (JP); Masahiro Oguma, Konan (JP); Yusuke Ikeda, Kashihara (JP); Yoichi Okamoto, Uji (JP)

(73) Assignee: DMG MORI SEIKI CO., LTD., Yamatokoriyama-Shi, Nara (JP)

(*) Notice: Subject to any disclaimer, the term of this patent is extended or adjusted under 35 U.S.C. 154(b) by 197 days.

(21) Appl. No.: 12/942,015

(22) Filed: Nov. 8, 2010

(65) Prior Publication Data

US 2011/0154835 A1 Jun. 30, 2011

(30) Foreign Application Priority Data

Dec. 25, 2009 (JP) ................. 2009-295810

(51) Int. Cl.
  *F25D 11/02* (2006.01)
  *F25D 17/02* (2006.01)
  *B23Q 11/12* (2006.01)
  *B23Q 11/14* (2006.01)

(52) U.S. Cl.
  CPC .............. *B23Q 11/126* (2013.01); *B23Q 11/14* (2013.01)

(58) Field of Classification Search
  CPC ...... F25D 17/02; F25D 31/002; F25D 31/004
  USPC ........ 62/84, 98, 122, 175, 179, 192, 201, 432
  See application file for complete search history.

(56) References Cited

U.S. PATENT DOCUMENTS

| 6,080,039 A * | 6/2000 | Bartlett et al. ................... 451/9 |
| 6,446,449 B2 * | 9/2002 | Krauter ........................... 62/201 |
| 2008/0295540 A1 * | 12/2008 | Kunz et al. ..................... 62/475 |

FOREIGN PATENT DOCUMENTS

| JP | 2926541 B2 | | 5/1999 |
| JP | 2002-39658 | * | 2/2002 |

* cited by examiner

*Primary Examiner* — Cheryl J Tyler
*Assistant Examiner* — Elizabeth Martin

(57) ABSTRACT

A machine tool cooling system and cooling method which allow cost reduction by reducing the number of control valves, and in which opening/closing control is simple are disclosed. The machine tool cooling system and cooling method include a hot oil tank storing hot oil, a cold oil tank storing cold oil, a first to third hot oil passages and a first to third cold oil passages, which supply the hot oil and the cold oil to a first to third heat generating portions, a hot oil return passage returning the hot oil to the hot oil tank, a first to third supply control valves interposed in the first to third cold oil passages, and a valve controller controlling opening/closing of the first to third supply control valves so that the cold oil is supplied to the first to third heat generating portions intermittently at different timings.

6 Claims, 5 Drawing Sheets

MACHINE TOOL COOLING SYSTEM AND COOLING METHOD

BACKGROUND OF THE INVENTION

1. Field of the Invention

The present invention relates to a cooling system and a cooling method for cooling heat generating portions, such as a spindle device, of a machine tool to a target temperature.

2. Description of the Related Art

Japanese Patent Publication No. 2926541 discloses a conventional cooling system and a cooling method for cooling a heat generating portion of a machine tool to a target temperature by cooling liquid. The cooling system and cooling method include a cold oil tank storing cooling liquid which is cooled to a temperature lower than the target temperature (hereinafter described as cold oil) and a hot oil tank storing cooling liquid which cooled the heat generating portion and is collected thereafter (hereinafter described as hot oil). The cooling system is structured to supply the cold oil in the cold oil tank and the hot oil in the hot oil tank alternately to the heat generating portion.

SUMMARY OF THE INVENTION

Incidentally, since the conventional system is structured to supply the cold oil and the hot oil alternately, it requires both of a cold oil control valve which opens/closes a cold oil supply passage and a hot oil control valve which opens/closes a hot oil supply passage. Accordingly, there is a problem of high cost. Further, since the heat generating portion is controlled to be at the target temperature by alternately opening/closing the cold oil control valve and the hot oil control valve, there is also a problem that the opening/closing control becomes complicated particularly when there are plural heat generating portions.

The present invention is made in view of the above-described conventional situation, and it is an object thereof to provide a machine tool cooling system and cooling method, which allow cost reduction by reducing the number of control valves, and in which opening/closing control does not become complicated when there are plural heat generating portions.

An aspect of the present invention is a machine tool cooling system for cooling a first heat generating portion and a second heat generating portion to a target temperature, the system including a high temperature tank storing high temperature cooling liquid which cooled the first and second heat generating portions, a low temperature tank storing low temperature cooling liquid which is cooled to a temperature lower than the target temperature, a first and second high temperature cooling liquid supply passages supplying the high temperature cooling liquid in the high temperature tank to the first and second heat generating portions, respectively, a first and second low temperature cooling liquid supply passages supplying the low temperature cooling liquid in the low temperature tank to the first and second heat generating portions, respectively, a high temperature cooling liquid return passage returning the cooling liquid which cooled the first and second heat generating portions to the high temperature tank, a first and second supply control valves interposed in the first and second low temperature cooling liquid supply passages, respectively, and a valve controller controlling opening/closing of the first and second supply control valves so that the low temperature cooling liquid is supplied to the first and second heat generating portions intermittently at different timings.

Another aspect of the present invention is a machine tool cooling method for cooling a first heat generating portion and a second heat generating portion to a target temperature, the method including supplying high temperature cooling liquid, which cooled the first and second heat generating portions and is collected thereafter and stored in a high temperature tank, constantly to the first and second heat generating portions, and supplying low temperature cooling liquid, which is cooled to a temperature lower than the target temperature and stored in a low temperature tank, intermittently at different timings to the first and second heat generating portions.

According to the aspect and another aspect of the present invention, the high temperature cooling liquid is supplied constantly to the heat generating portions, and the low temperature cooling liquid is supplied intermittently at different timings to the heat generating portions. Thus, it is possible to eliminate the need of a supply control valve for the high temperature cooling liquid, thereby allowing cost reduction.

Further, since the high temperature cooling liquid is supplied constantly at a fixed rate and only the supply amount of the low temperature cooling liquid is controlled, a problem such as complicating the control when there are plural heat generating portions can be prevented, and temperatures of the heat generating portions can be controlled to a target temperature with necessary and sufficient accuracy.

Moreover, when the first heat generating portion and the second heat generating portion are cooled, the low temperature cooling liquid is supplied to the first heat generating portion and the second heat generating portion intermittently at different timings. Thus, overlapping periods of opening of the valves corresponding to the heat generating portions can be made as short as possible, a high-load operating time of a supply pump can be reduced, and thereby durability of the supply pump can be improved.

Further, respective opening periods of the valves can be completely shifted from each other. In this case, the load of the supply pump can be reduced further.

In a preferred embodiment of the present invention, there are provided a low temperature cooling liquid return passage returning the low temperature cooling liquid from the low temperature tank to the low temperature tank, and a return control valve interposed in the low temperature cooling liquid return passage, in which during a period in which the low temperature cooling liquid is supplied to neither the first heat generating portion nor the second heat generating portion, the valve controller opens the return control valve to return the low temperature cooling liquid to the low temperature tank.

In another preferred embodiment of the present invention, during a period in which the low temperature cooling liquid from the low temperature tank is supplied to neither the first heat generating portion nor the second heat generating portion, the low temperature cooling liquid is returned to the low temperature tank.

According to the preferred and another preferred embodiments of the present invention, during a period in which the low temperature cooling liquid is supplied to neither the first heat generating portion nor the second heat generating portion, the low temperature cooling liquid is returned to the low temperature tank. Thus, even though there are plural heat generating portions, the necessary discharge rate of the supply pump can be suppressed to a constant rate, and stability of operation can be increased.

DETAILED DESCRIPTION OF THE PREFERRED EMBODIMENTS

Hereinafter, embodiments of the present invention will be described based on the attached drawings.

Embodiment 1

Figure 1:
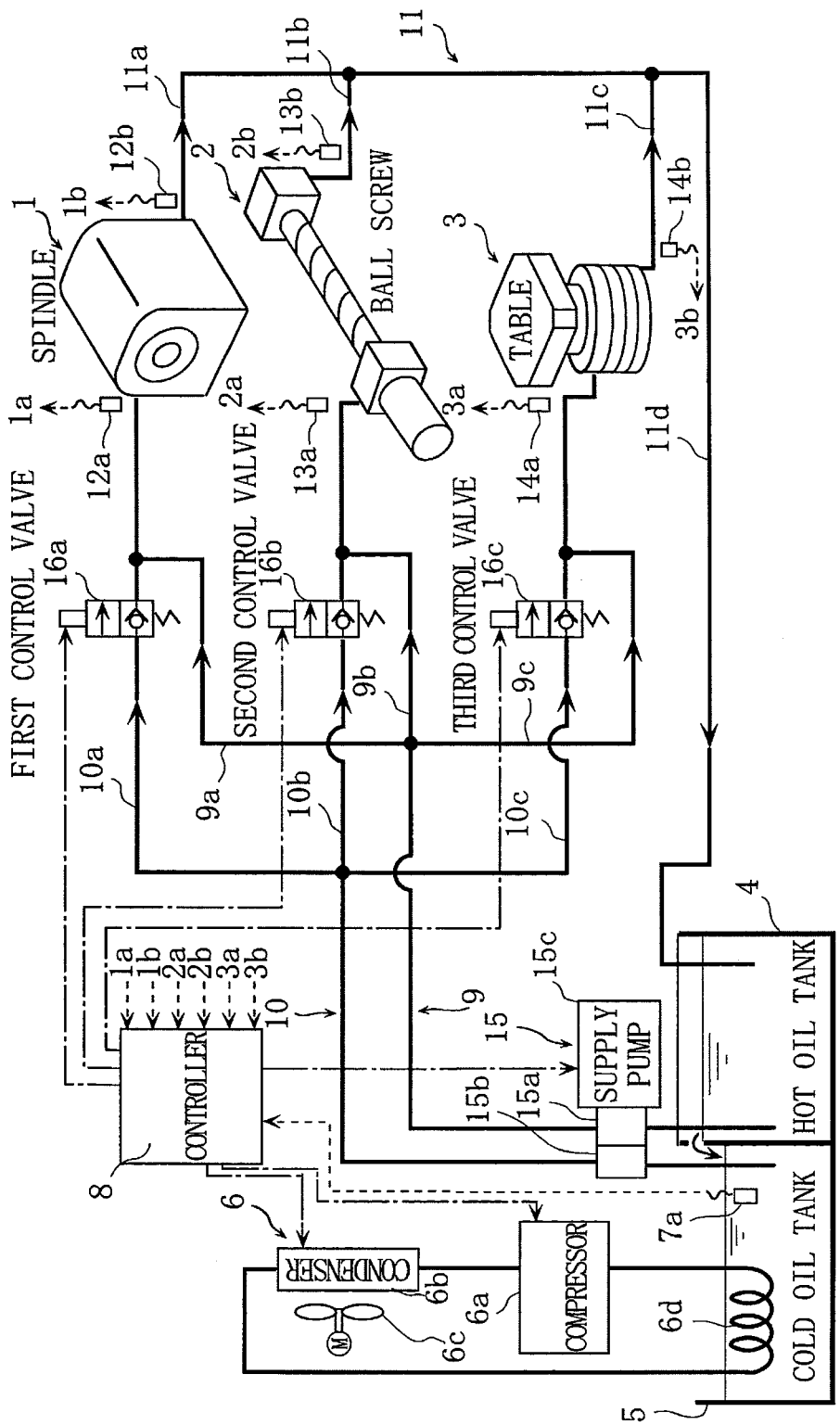
FIG. 1 is a block configuration diagram for describing a machine tool cooling system and cooling method according to embodiment 1 of the present invention.
Figure 2:
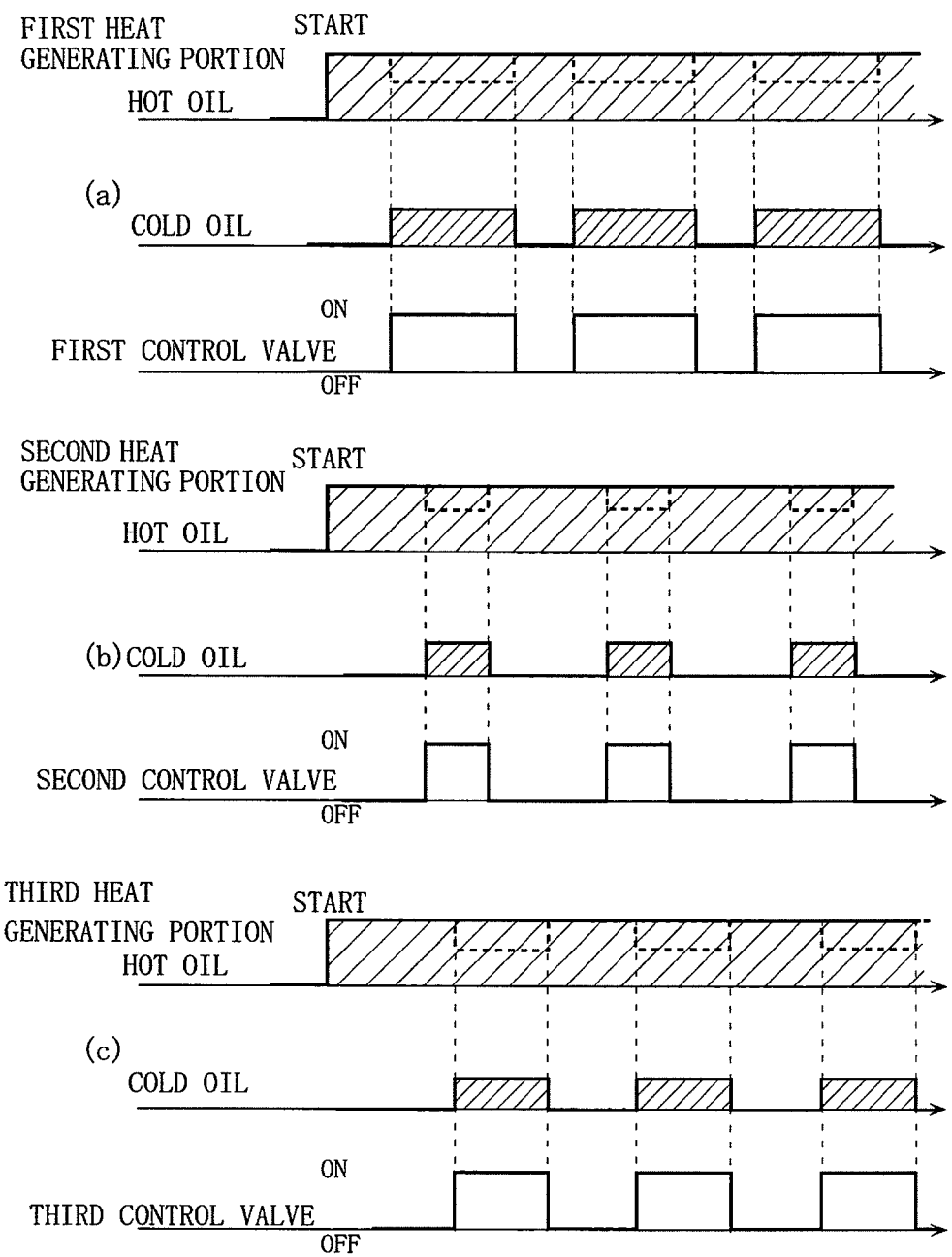
FIG. 2 is a timing chart of opening/closing timings of control valves of the embodiment 1.

FIG. 1 and FIG. 2 are diagrams for describing a machine tool cooling system and cooling method according to embodiment 1 of the present invention.

In the drawings, numerals 1, 2, 3 denote a first, second, and third heat generating portions of a machine tool cooled by the cooling system and cooling method of this embodiment. Specifically, the first heat generating portion 1 is a spindle device, the second heat generating portion 2 is a ball screw feeding unit, and the third heat generating portion 3 is a table, and each portion generates heat from a bearing part, a motor, and the like for example. By the system of this embodiment, the first, second, and third units 1, 2, 3 are lubricated by cooling liquid which also serves as lubricating oil, and cooled to a predetermined target temperature.

Further, numeral 4 denotes a hot oil tank (high temperature tank) storing high temperature cooling liquid (hereinafter described as hot oil), which cooled the first to third heat generating portions 1 to 3 and increased in temperature, and numeral 5 denotes a cold oil tank (low temperature tank) storing low temperature cooling liquid (hereinafter described as cold oil), which is the cold oil cooled to a predetermined temperature lower than the target temperature.

When the hot oil returned to the hot oil tank 4 exceeds a predetermined amount, the hot oil moves to the cold oil tank 5 by overflowing. This hot oil in the cold oil tank 5 is cooled to a predetermined temperature lower than the target temperature by an oil cooling device 6, and is kept to this predetermined temperature.

The oil cooling device 6 has a compressor 6a circulating a cooling medium, a condenser 6b, a cooling fan 6c supplying cooling air to the condenser 6b, and a heat exchanger 6d immersed in the cold oil. The temperature of the cold oil in the cold oil tank 5 is detected by a temperature sensor 7a, and this detected temperature is supplied to a controller 8. The controller 8 controls operations of the compressor 6a and the cooling fan 6c so that the detected temperature turns to the predetermined temperature.

Numeral 9 denotes a hot oil supply passage (high temperature cooling liquid supply passage) supplying the hot oil in the hot oil tank 4 to the first, second, and third heat generating portions 1, 2, 3. Further, numeral 10 denotes a cold oil supply passage (low temperature cooling liquid supply passage) supplying the cold oil in the cold oil tank 5 to the first, second, and third heat generating portions 1, 2, 3. Moreover, numeral 11 denotes a hot oil return passage (high temperature cooling liquid return passage) returning the hot oil, which is supplied to the first, second, and third heat generating portions 1, 2, 3 and increased in temperature by lubricating and cooling these heat generating portions 1 to 3, to the hot oil tank 4.

At intermediate positions of the hot oil supply passage 9 and the cold oil supply passage 10, there is interposed a supply pump 15 of variable flow control type having a hot oil pump 15a and a cold oil pump 15b, which are driven by a common motor 15c.

Further, the hot oil supply passage 9 has a first, second, and third hot oil passages 9a, 9b, 9c branched corresponding to the first, second and third heat generating portions 1, 2, 3.

Similarly, the cold oil supply passage 10 has a first, second, and third cold oil passages 10a, 10b, 10c branched corresponding to the first, second and third heat generating portions 1, 2, 3. In the first, second, and third cold oil passages 10a, 10b, 10c, a first, second, and third control valves 16a, 16b, 16c are interposed respectively, which are opened when electric current is applied thereto.

The first, second, and third hot oil passages 9a, 9b, 9c and the first, second, and third cold oil passages 10a, 10b, 10c merge together on the downstream side of the first, second, and third control valves 16a, 16b, 16c, and are connected to supply ports of the first, second, and third heat generating portions 1, 2, 3. Further, a first, second, and third supply side temperature sensors 12a, 13a, 14a are disposed on their respective connecting parts.

The hot oil return passage 11 has a first, second, and third hot oil return passages 11a, 11b, 11c connected to return ports of the first, second, and third heat generating portions 1, 2, 3, and a merge passage 11d merging the hot oil return passages and connects them to the hot oil tank 4. At the return ports of the first, second, and third heat generating portions 1, 2, 3, a first, second, and third return side temperature sensors 12b, 13b, 14b are disposed.

Detection signals 1a, 2a, 3a of the first, second, and third supply side temperature sensors 12a, 13a, 14a and detection signals 1b, 2b, 3b of the first, second, and third return side temperature sensors 12b, 13b, 14b are inputted to the controller 8. This controller 8 controls opening/closing of the first, second, and third control valves 16a, 16b, 16c so that the temperatures of the first, second, and third heat generating portions 1, 2, 3 become a first, second, and third target temperatures which are set in advance.

When the cooling system of this embodiment 1 is actuated, as illustrated in FIG. 2, the hot oil in the hot oil tank 4 is supplied constantly to the first, second, and third heat generating portions 1, 2, 3 via the first, second, and third hot oil passages 9a, 9b, 9c of the hot oil supply passage 9 by the hot oil pump 15a of the supply pump 15.

On the other hand, the cold oil of the cold oil tank 5 is supplied to the first, second, and third heat generating portions 1, 2, 3 via the first, second, and third cold oil passages 10a, 10b, 10c of the cold oil supply passage 10 by the cold oil pump 15b of the supply pump 15 only in a period in which the first, second, and third control valves 16a, 16b, 16c are turned on.

Specifically, the hot oil supplied to the first, second, and third hot oil passages 9a, 9b, 9c of the hot oil supply passage 9 and the cold oil supplied to the first, second, and third cold oil passages 10a, 10b, 10c of the cold oil supply passage 10 are merged together on the downstream side of the first, second, and third control valves 16a, 16b, 16c and then supplied to the first, second, and third heat generating portions 1, 2, 3.

Then, opening/closing of the first to third control valves 16a to 16c are controlled so that the temperatures of the first to third heat generating portions 1 to 3 obtained by the detected temperatures from the supply side temperature sensors 12a to 14a and the return side temperature sensors 12b to 14b of the first to third heat generating portions 1 to 3 become the target temperatures. In this case, the first, second, and third control valves 16a, 16b, 16c are controlled so that the cold oil is supplied intermittently at different timings. In the case of this embodiment 1, cold oil supply periods of the respective control valves overlap partially, but their supply start timings are controlled to be different, and these overlapping periods are made as short as possible.

In this manner, according to this embodiment 1, the hot oil is supplied constantly to the first to third heat generating portions 1 to 3, and the cold oil is supplied intermittently at different timings to the first to third heat generating portions 1 to 3. Thus, by controlling only the supply amount of the cold oil, it is possible to keep the first to third heat generating portions 1 to 3 at their respective target temperatures, and this control is easy compared to the case where both the cold oil and the hot oil are controlled.

While the first to third heat generating portion 1 to 3 are kept at the target temperatures, it is possible to eliminate a supply control valve for the high temperature cooling liquid, thereby allowing cost reduction.

In addition, the supply pump 15 is of the type which variably controls the flow rate, and is controlled so that the flow rate of the hot oil does not decrease also in the period in which the first to third control valves 16a to 16c are turned on to supply the cold oil. In this case, since the cold oil is supplied intermittently at different supply start timings, the overlapping periods of opening of the valves can be made as short as possible, a high-load operating time of the supply pump 15 can be reduced, and thereby durability of the supply pump 15 can be improved.

On the other hand, when the supply pump 15 is, for example, a metering pump with a constant discharge rate, in a period in which the control valves are turned on to supply the cold oil, it is conceivable that the flow rate of the hot oil decreases by the flow rate of the cold oil as illustrated by dashed lines in FIG. 2. The term "supplying hot oil constantly" in the present invention includes such a case.

Further, supply of the cold oil in the present invention is not limited to the pattern such that the first to third control valves 1 to 3 open at different timings as illustrated in FIG. 2. It is of course possible to employ, for example, a pattern illustrated in FIG. 3 or FIG. 4.

Figure 3:
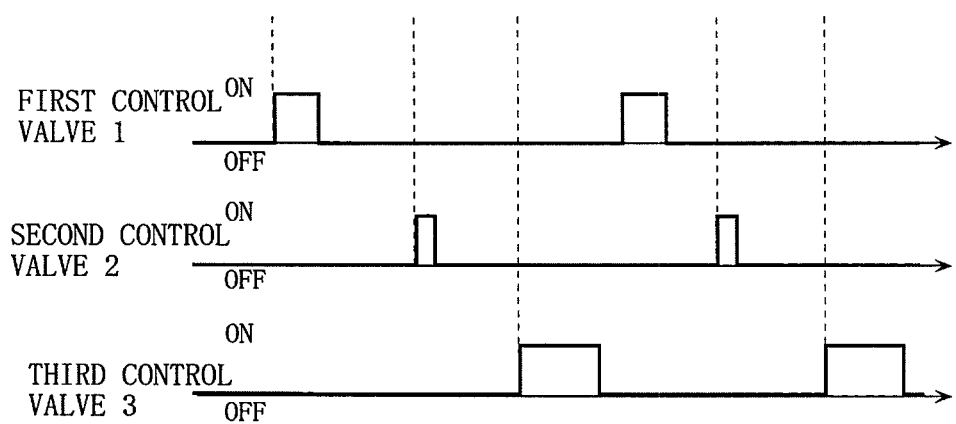
FIG. 3 is a timing chart illustrating a modification example of the opening/closing timings.

In the pattern of FIG. 3, timings to supply the cold oil to the first to third heat generating portions 1 to 3, namely, timings when the first to third control valves turn on and timings when they turn off are set differently.

In the pattern of FIG. 3, when the first to third heat generating portions 1 to 3 are cooled, the cold oil is supplied to the first to third heat generating portions 1 to 3 intermittently at different timings without overlapping. Thus, while the cold oil is supplied to the plural heat generating portions, the necessary flow rate of the cold oil can be suppressed to the same level as when there is a single heat generating portion, and further increase in size of the supply pump 15 can be suppressed, thereby avoiding cost increase.

Figure 4:
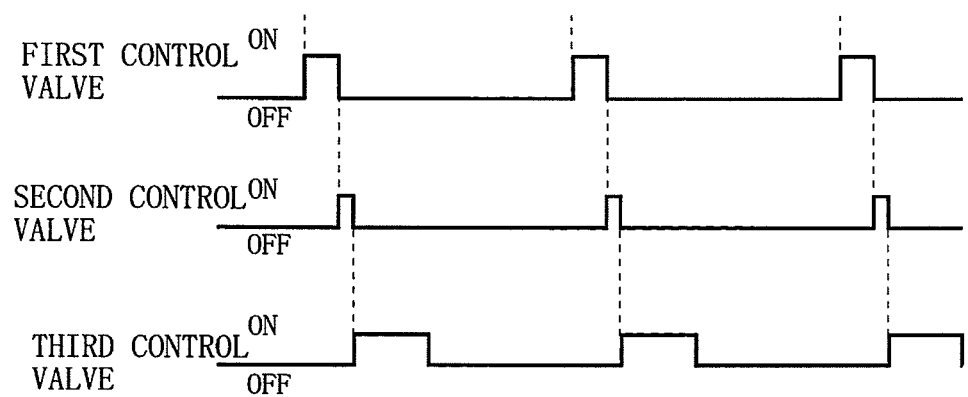
FIG. 4 is a timing chart illustrating another modification example of the opening/closing timings.

In the pattern of FIG. 4, when the first to third heat generating portions 1 to 3 are cooled, the cold oil is supplied to the first to third heat generating portions 1 to 3 intermittently at different timings and further sequentially.

In the pattern of FIG. 4, the first to third control valves 16a to 16c turn on sequentially without overlapping, and thus in this period, a flow variation of the cold oil does not occur, the supply amount of the cold oil becomes stable, and durability of the system can be secured.

Figure 5:
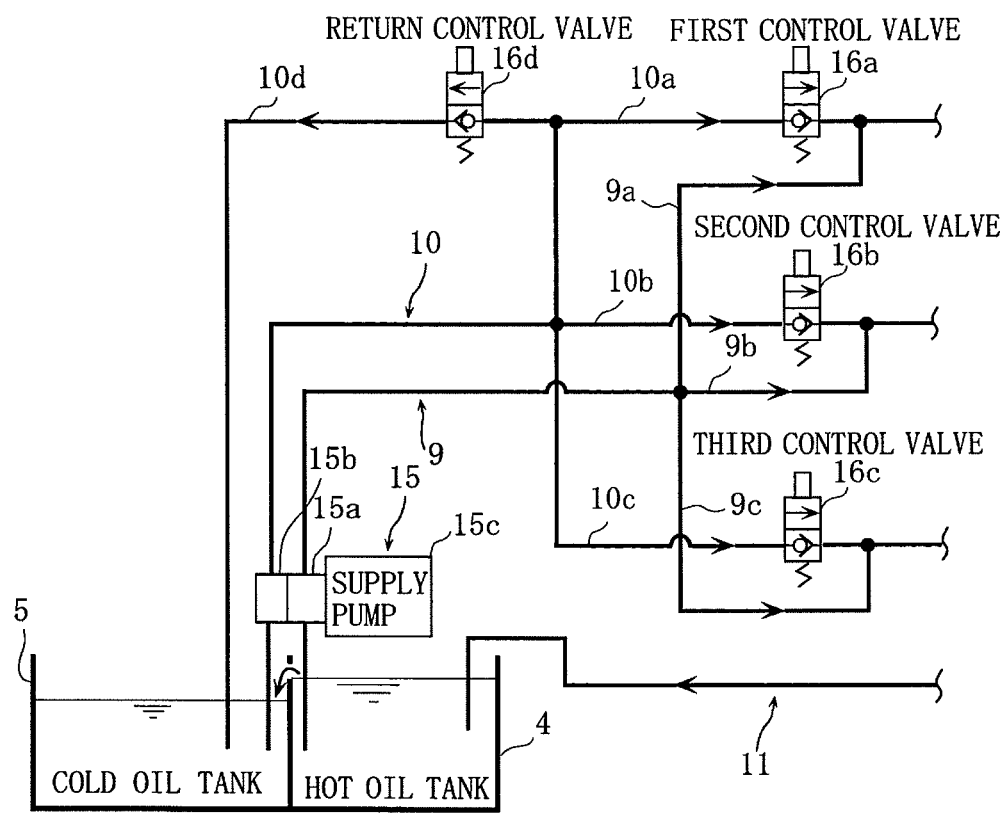
FIG. 5 is a block configuration diagram for describing embodiment 2 of the present invention.
Figure 6:
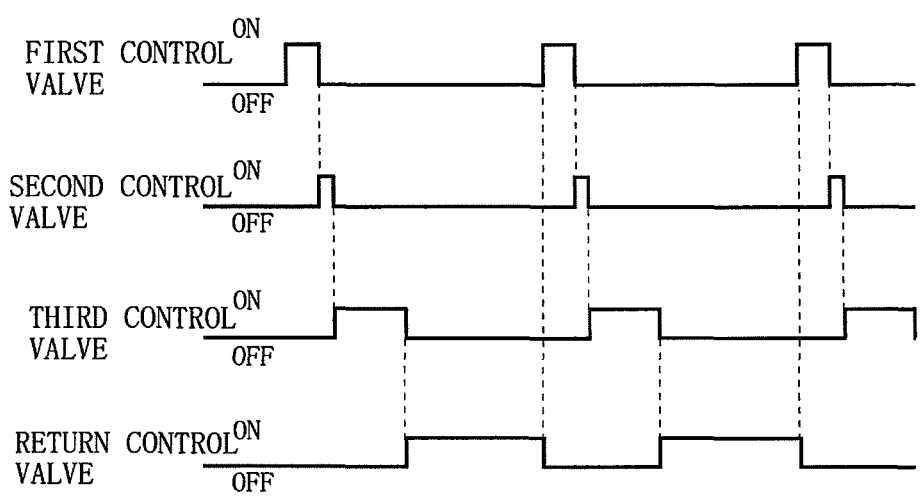
FIG. 6 is a timing chart of opening/closing timings of control valves of the embodiment 2.

FIG. 5 and FIG. 6 are diagrams for describing embodiment 2 of the present invention, in which the pattern of FIG. 4 is further improved. In the diagrams, the same numerals as those in FIG. 1 denote the same or equivalent parts. Note that the depiction of the cooling device 6 in FIG. 1 is omitted in FIG. 5.

In the embodiment 2, in addition to the embodiment 1, a cold oil return passage 10d returning the cold oil from the cold oil supply passage 10 to the cold oil tank 5 is further formed to branch therefrom, and a cold oil return control valve 16d is interposed in this cold oil return passage 10d.

In the embodiment 2, the valve controller 8 turns on the first to third control valves 16a to 16c at different timings sequentially without overlapping as illustrated in FIG. 6, and in a period in which the first to third control valves 1 to 3 are all turned off and not supplying the cold oil, the valve controller 8 controls the cold oil return control valve 16d to open so as to return the cold oil to the cold oil tank 5.

Thus, in this embodiment 2, when the first to third heat generating portions 1 to 3 are cooled, in a period in which the cold oil is supplied to none of the first to third heat generating portions 1 to 3, the cold oil return control valve 16d is turned on to return the cold oil discharged from the supply pump 15 to the cold oil tank 5. Accordingly, the necessary discharge rate of the supply pump 15 can be kept constant, stability of operation can be increased, and durability of the system can be improved. Further, a metering pump with a constant discharge amount can be employed, thereby allowing cost reduction.

It should be noted that, although the cases where there are three heat generating portions are described in the embodiments 1 and 2, the present invention is of course applicable to the case where there are two heat generating portions or the case where there are four or more heat generating portions.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

The text of Japanese priority application No. 2009-295810 filed on Dec. 25, 2009, is hereby incorporated by reference.

What is claimed is:

1. A machine tool cooling system for cooling a first heat generating portion and a second heat generating portion to a target temperature, the system comprising:
    a high temperature tank storing a high temperature cooling liquid which cooled the first and second heat generating portions;
    a low temperature tank storing a low temperature cooling liquid which is cooled to a temperature lower than the target temperature;
    first and second high temperature cooling liquid supply passages supplying the high temperature cooling liquid in the high temperature tank to the first and second heat generating portions, respectively;
    first and second low temperature cooling liquid supply passages supplying the low temperature cooling liquid in the low temperature tank to the first and second heat generating portions, respectively;
    a high temperature cooling liquid return passage returning the cooling liquid which cooled the first and second heat generating portions to the high temperature tank;

first and second supply control valves interposed at the upstream side of the first and second heat generating portions in the first and second low temperature cooling liquid supply passages, respectively, wherein the first and second high temperature cooling supply passages and the first and second low temperature cooling supply passages merge together on the downstream side of the first and second supply control valves and on the upstream side of the first and second heat generating portions and are connected to supply ports of the first and second heat generating portions; and a valve controller controlling opening/closing of the first and second supply control valves so that the low temperature cooling liquid is supplied to the first and second heat generating portions intermittently without overlapping by shifting completely an opening period between the first and second supply control valves such that when one of the first and second supply control valves is closed, the other of the first and second supply control valves is opened.

2. The machine tool cooling system according to claim 1, further comprising:

a low temperature cooling liquid return passage returning the low temperature cooling liquid to the low temperature tank; and a return control valve interposed in the low temperature cooling liquid return passage, wherein during a period in which the low temperature cooling liquid is supplied to neither the first heat generating portion nor the second heat generating portion, the valve controller opens the return control valve to return the low temperature cooling liquid to the low temperature tank.

3. A machine tool cooling method for cooling a first heat generating portion and a second heat generating portion to a target temperature, the method comprising:

providing first and second high temperature cooling supply passages and first and second low temperature cooling supply passages that merge together on the downstream side of first and second supply control valves and on the upstream side of the first and second heat generating portions and are connected to supply ports of the first and second heat generating portions;

constantly supplying a high temperature cooling liquid through the first and second high temperature cooling supply passages to the first and second heat generating portions and collecting and storing the high temperature cooling liquid in a high temperature tank thereafter; and supplying a low temperature cooling liquid, through the first and second low temperature cooling supply passages, which has been cooled to a temperature lower than the target temperature and stored in a low temperature tank, intermittently without overlapping by shifting completely a supplying period between the first and second supply control valves to the first and second heat generating portions such that when one of the first and second supply control valves is closed, the other of the first and second supply control valves is opened.

4. The machine tool cooling method according to claim 3, further comprising the step of returning the low temperature cooling liquid to the low temperature tank when the low temperature cooling liquid from the low temperature tank is supplied to neither the first heat generating portion nor the second heat generating portion.

5. A machine tool cooling system for cooling a first heat generating portion and a second heat generating portion to a target temperature, the system comprising:

a high temperature tank storing a high temperature cooling liquid which cooled the first and second heat generating portions;

a low temperature tank storing a low temperature cooling liquid which is cooled to a temperature lower than the target temperature;

first and second high temperature cooling liquid supply passages supplying the high temperature cooling liquid in the high temperature tank to the first and second heat generating portions, respectively;

first and second low temperature cooling liquid supply passages supplying the low temperature cooling liquid in the low temperature tank to the first and second heat generating portions, respectively;

a high temperature cooling liquid return passage returning the cooling liquid which cooled first and second heat generating portions to the high temperature tank;

first and second supply control valves interposed at the upstream side of the first and second heat generating portions in the first and second low temperature cooling liquid supply passages, respectively, wherein the first and second high temperature cooling supply passages and the first and second low temperature cooling supply passages merge together on the downstream side of the first and second supply control valves and on the upstream side of the first and second heat generating portions and are connected to supply ports of the first and second heat generating portions; and a valve controller controlling opening/closing of the first and second supply control valves so that the low temperature cooling liquid is supplied to the first and second heat generating portions sequentially without overlapping by shifting an opening period between the first and second supply control valves such that when one of the first and second supply control valves is closed, the other of the first and second supply control valves is opened.

6. The machine tool cooling system according to claim 5, further comprising:

a low temperature cooling liquid return passage returning the low temperature cooling liquid to the low temperature tank; and a return control valve interposed in the low temperature cooling liquid return passage, wherein during a period in which the low temperature cooling liquid is supplied to neither the first heat generating portion nor the second heat generating portion, the valve controller opens the return control valve to return the low temperature cooling liquid to the low temperature tank.

* * * * *